US011300047B2

(12) United States Patent
Ito et al.

(10) Patent No.: US 11,300,047 B2
(45) Date of Patent: Apr. 12, 2022

(54) COMBUSTION DEVICE AND GAS TURBINE

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI Corporation, Tokyo (JP)

( * ) Notice: Subject to any disclaimer, the term of this patent is extended or adjusted under 35 U.S.C. 154(b) by 140 days.

(21) Appl. No.: 16/582,159

(22) Filed: Sep. 25, 2019

(65) Prior Publication Data
US 2020/0018231 A1 Jan. 16, 2020

Related U.S. Application Data

(63) Continuation of application No. PCT/JP2018/011043, filed on Mar. 20, 2018.

(30) Foreign Application Priority Data

Mar. 27, 2017 (JP) .............................. JP2017-061212

(51) Int. Cl.
F02C 3/20 (2006.01)
F02C 3/30 (2006.01)
(Continued)

(52) U.S. Cl.
CPC ................. F02C 3/22 (2013.01); F02C 3/20 (2013.01); F02C 3/30 (2013.01); F02C 9/28 (2013.01);
(Continued)

(58) Field of Classification Search
CPC ...... F02C 3/20; F02C 3/22; F02C 3/24; F02C 3/30; F02C 9/26; F02C 9/28; F02C 9/40
See application file for complete search history.

(56) References Cited

U.S. PATENT DOCUMENTS 5,584,172 A * 12/1996 Oguchi .............. B01D 53/8625
60/39.24
8,424,292 B2 4/2013 Hoyte et al.
(Continued)

FOREIGN PATENT DOCUMENTS

CN 102116192 A 7/2011
JP 01-189335 A 7/1989
(Continued)

OTHER PUBLICATIONS

Office Action issued for corresponding Chinese Application No. 201880018937.8 dated Mar. 20, 2020 (15 pages).
(Continued)

Primary Examiner — William H Rodriguez
(74) Attorney, Agent, or Firm — Rothwell, Figg, Ernst & Manbeck, P.C.

(57) ABSTRACT

A combustion device includes an ammonia supply unit supplying primary reduction ammonia as a nitrogen oxide reducing agent into a combustor and mixing secondary reduction ammonia with combustion exhaust gas discharged from the combustor to reduce nitrogen oxide contained in the combustion exhaust gas and a controller configured to control at least one of the amount of supply of the primary reduction ammonia and the amount of mixing of the secondary reduction ammonia with the combustion exhaust gas in accordance with concentrations of residual nitrogen oxide and residual ammonia contained in the combustion exhaust gas after being discharged from the combustor.

13 Claims, 4 Drawing Sheets

(51) Int. Cl.
*F02C 9/28* (2006.01)
*F02C 3/22* (2006.01)
*F02C 9/40* (2006.01)
*F02C 9/26* (2006.01)
*B01D 53/86* (2006.01)
*B01D 53/94* (2006.01)

(52) U.S. Cl.
CPC ............ *F02C 9/40* (2013.01); *B01D 53/8631* (2013.01); *B01D 53/9431* (2013.01); *F02C 9/26* (2013.01); *F05D 2270/082* (2013.01)

(56) References Cited

U.S. PATENT DOCUMENTS

| | | | |
|---|---|---|---|
| 9,500,580 B1* | 11/2016 | Mitra | G01N 33/004 |
| 2002/0182127 A1 | 12/2002 | Braun et al. | |
| 2004/0057888 A1* | 3/2004 | Buzanowski | B01D 53/90 423/235 |
| 2004/0057889 A1* | 3/2004 | Buzanowski | B01D 53/8696 423/235 |
| 2004/0148940 A1* | 8/2004 | Venkateswaran | F01D 17/085 60/772 |
| 2008/0116054 A1* | 5/2008 | Leach | B01D 53/72 204/157.3 |
| 2010/0101409 A1* | 4/2010 | Bromberg | F01N 13/009 95/8 |
| 2011/0154806 A1* | 6/2011 | Hoyte | G01J 3/10 60/276 |
| 2012/0036825 A1 | 2/2012 | Kasuga et al. | |
| 2012/0047870 A1 | 3/2012 | Kasuga et al. | |
| 2012/0085082 A1* | 4/2012 | Levijoki | F01N 11/00 60/274 |
| 2012/0096835 A1* | 4/2012 | Gates | F23J 15/003 60/274 |
| 2014/0202166 A1* | 7/2014 | Kagolanu | F02C 9/00 60/773 |
| 2014/0373511 A1* | 12/2014 | Osburn | F01N 3/103 60/274 |
| 2017/0167349 A1* | 6/2017 | Balram | B01D 53/9431 |
| 2020/0063634 A1* | 2/2020 | Smith | F02D 41/1453 |

FOREIGN PATENT DOCUMENTS

| | | |
|---|---|---|
| JP | 07-163836 A | 6/1995 |
| JP | 2012-255420 A | 12/2012 |
| JP | 2015-031215 A | 2/2015 |
| JP | 2015-094496 A | 5/2015 |
| JP | 2016-183840 A | 10/2016 |
| JP | 2016-191507 A | 11/2016 |
| WO | 2010/082359 A1 | 7/2010 |
| WO | 2010/082360 A1 | 7/2010 |

OTHER PUBLICATIONS

Tingyu Zhu, Emission Control Technologies and Engineering Applications for Sintering Flue Gas, Metallurgical Industry Press Co., Ltd., Jan. 2015, pp. 1-5, Metallurgical Industry Press, China.

* cited by examiner

COMBUSTION DEVICE AND GAS TURBINE

This application is a Continuation application based on International Application No. PCT/JP2018/011043, filed on Mar. 20, 2018, which claims priority on Japanese Patent Application No. 2017-061212, filed on Mar. 27, 2017, the contents of which are incorporated herein by reference.

TECHNICAL FIELD

The present disclosure relates to a combustion device and a gas turbine.

BACKGROUND ART

Patent Document 1 discloses a combustion device and a gas turbine combusting ammonia as a fuel. In the combustion device and the gas turbine, a reduction region in which nitrogen oxide (NOx) generated in a combustion region is reduced by means of primary reduction ammonia is formed on the downstream side in a combustor so that the nitrogen oxide in the combustor is reduced. Here, the reduction of the nitrogen oxide by means of the ammonia is referred to as denitrification and a device denitrifying the nitrogen oxide by using the ammonia is referred to as a denitrification device.

In the combustion device and the gas turbine described above, secondary reduction ammonia as a reducing agent for the nitrogen oxide contained in combustion exhaust gas is supplied to the passage path of the combustion exhaust gas discharged from the combustor.

CITATION LIST

Patent Document

[Patent Document 1] Japanese Unexamined Patent Application, First Publication No. 2016-191507

SUMMARY OF INVENTION

Technical Problem

Although using primary or secondary reduction ammonia is described in Patent Document 1, Patent Document 1 does not disclose any specific method for primary or secondary reduction ammonia supply amount control. Accordingly, an appropriate method for primary or secondary reduction ammonia supply amount control is desired.

The present disclosure has been made in view of such circumstances, and an object of the present disclosure is to provide a combustion device and a gas turbine with which the amount of primary reduction ammonia supply or the amount of secondary reduction ammonia supply can be appropriately controlled.

Solution to Problem

A combustion device according to a first aspect of the present disclosure includes an ammonia supply unit supplying primary reduction ammonia as a nitrogen oxide reducing agent into a combustor and mixing secondary reduction ammonia with combustion exhaust gas discharged from the combustor to reduce nitrogen oxide contained in the combustion exhaust gas and a controller configured to control at least one of the amount of supply of the primary reduction ammonia and the amount of mixing of the secondary reduction ammonia with the combustion exhaust gas in accordance with concentrations of residual nitrogen oxide and residual ammonia contained in the combustion exhaust gas after being discharged from the combustor.

The combustion device according to a second aspect of the present disclosure, in the first aspect, further includes a catalyst reduction unit removing the nitrogen oxide contained in the combustion exhaust gas with which the secondary reduction ammonia is mixed, by using a reduction catalyst. The controller is configured to control the amount of supply of the secondary reduction ammonia in accordance with concentrations of the residual nitrogen oxide and the residual ammonia contained in the combustion exhaust gas that has flowed through the catalyst reduction unit.

In the combustion device according to a third aspect of the present disclosure, in the first or second aspect, the controller is configured to reduce the amount of mixing of the secondary reduction ammonia with the combustion exhaust gas in a case where the residual nitrogen oxide has a concentration equal to or less than a first regulatory value and the residual ammonia has a concentration exceeding a second regulatory value.

In the combustion device according to a fourth aspect of the present disclosure, in any one of the first to third aspects, the controller is configured to change the amount of supply of the primary reduction ammonia in a case where the residual nitrogen oxide has a concentration exceeding a first regulatory value and the residual ammonia has a concentration equal to or less than a second regulatory value.

In the combustion device according to a fifth aspect of the present disclosure, in the fourth aspect, the controller is configured to increase the amount of mixing of the secondary reduction ammonia in a case where the residual nitrogen oxide has a concentration exceeding the first regulatory value, the residual ammonia has a concentration equal to or less than the second regulatory value, and the amount of supply of the primary reduction ammonia is unchangeable.

In the combustion device according to a sixth aspect of the present disclosure, in any one of the first to fifth aspects, the controller is configured to determine that a failure has occurred in the combustion device or the catalyst reduction unit in a case where the residual nitrogen oxide has a concentration exceeding a first regulatory value and the residual ammonia has a concentration exceeding a second regulatory value.

A gas turbine according to a seventh aspect of the present disclosure includes the combustion device according to any one of the first to sixth aspects and a gas analyzer measuring concentrations of the residual nitrogen oxide and the residual ammonia contained in the combustion exhaust gas.

Advantageous Effects of Invention

According to the present disclosure, it is possible to appropriately control the amount of primary reduction ammonia supply or the amount of secondary reduction ammonia supply.

DESCRIPTION OF EMBODIMENTS

Hereinafter, an embodiment of the present disclosure will be described with reference to accompanying drawings.

Figure 1:
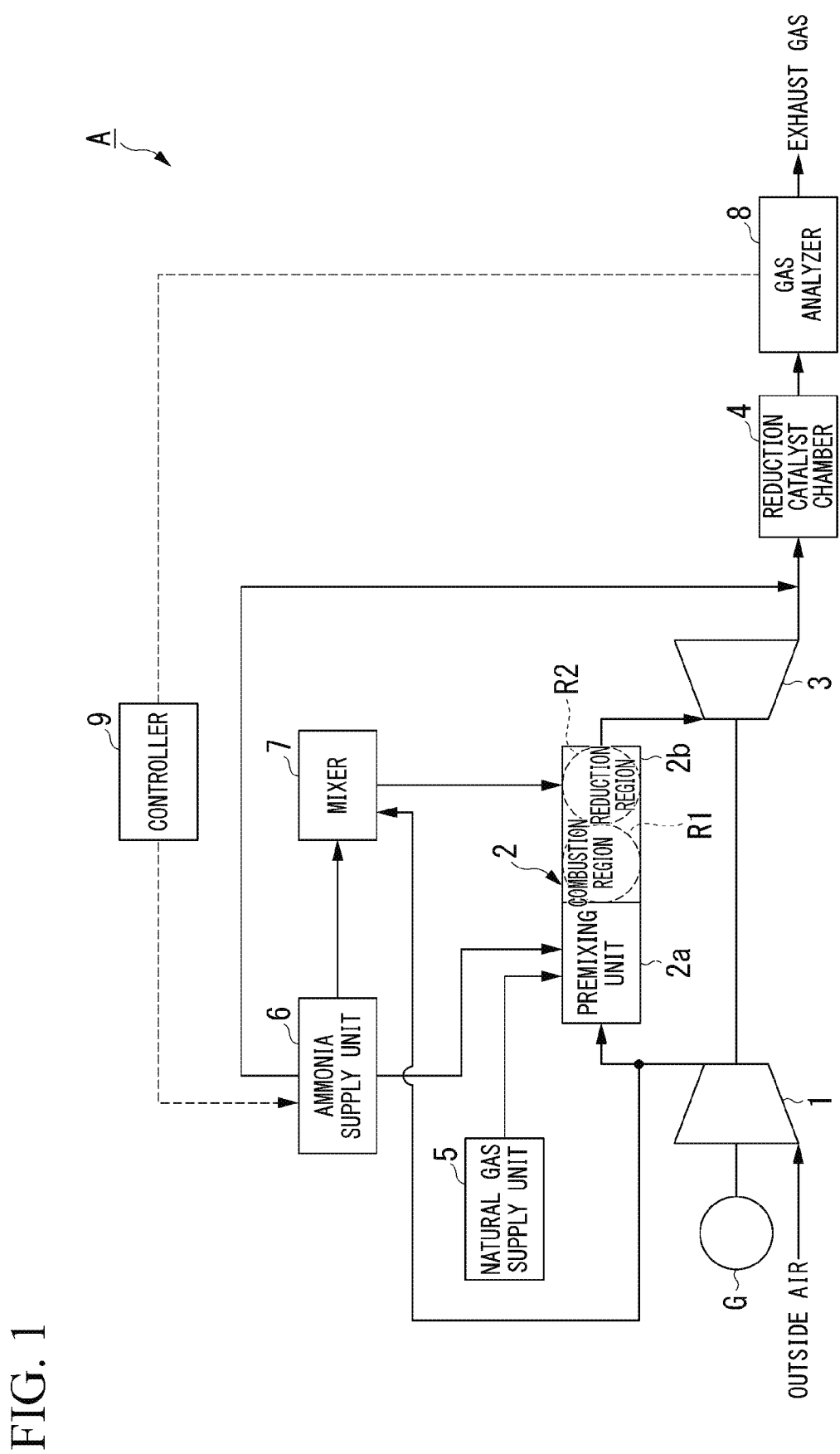
FIG. 1 is a block diagram showing an overall configuration of a combustion device and a gas turbine according to an embodiment of the present disclosure.

As shown in FIG. 1, a gas turbine A according to an embodiment of the present disclosure is provided with a compressor 1, a combustor 2, a turbine 3, a reduction catalyst chamber 4, a natural gas supply unit 5, an ammonia supply unit 6, a mixer 7, a gas analyzer 8, and a controller 9. The combustor 2, the reduction catalyst chamber 4, the natural gas supply unit 5, the ammonia supply unit 6, the mixer 7, and the controller 9 constitute a combustion device (symbol omitted) in the present embodiment. The gas turbine A is a drive source of a generator G and generates rotational power by combusting natural gas and ammonia as fuels. The reduction catalyst chamber 4 is an example of a catalyst reduction unit of the present disclosure.

The compressor 1 generates compressed air by compressing air taken in from outside air to a predetermined pressure. The compressor 1 supplies the compressed air to the combustor 2. In other words, the compressor 1 generates primary combustion air (compressed air) used for fuel combustion in the combustor 2 and supplies the primary combustion air (compressed air) to the combustor 2.

The combustor 2 is provided with a premixing unit 2a and a combustion chamber 2b.

The premixing unit 2a is provided in the front stage of the combustion chamber 2b. The premixing unit 2a is a functional unit mixing the primary combustion air supplied from the compressor 1 with the fuels supplied from the natural gas supply unit 5 and the ammonia supply unit 6 and supplies the mixed gas obtained by the mixing to the combustion chamber 2b. The fuels in the combustor 2 are the natural gas supplied from the natural gas supply unit 5 and the fuel ammonia supplied from the ammonia supply unit 6. The premixing unit 2a generates the mixed gas by mixing the fuel containing the natural gas and the fuel ammonia with the primary combustion air.

The internal space (combustion space) of the combustion chamber 2b has a combustion region R1 and a reduction region R2. In the combustion region R1, the fuel is combusted by the primary combustion air and high-temperature and high-pressure combustion exhaust gas containing nitrogen oxide (NOx) is generated as a result.

The reduction region R2 is a space adjacent to the combustion region R1. In the reduction region R2, the nitrogen oxide (NOx) is reduced by the primary reduction ammonia that is supplied from the ammonia supply unit 6 via the mixer 7. In other words, in the reduction region R2, the nitrogen oxide (NOx) that is contained in the combustion exhaust gas is reduced to nitrogen gas. Secondary combustion air as well as the primary reduction ammonia is supplied from the mixer 7 to the reduction region R2. Accordingly, in the reduction region R2, combustion of the unburned component of the fuel contained in the combustion exhaust gas occurs in addition to the reduction reaction of nitrogen oxide (NOx).

Here, ammonia is generally known as a substance that burns yet has a low combustibility (that is difficult to burn). However, in the combustion region R1, the fuel is burned at or near a stoichiometric ratio and in a state where the fuel ammonia is mixed with the natural gas, and thus the fuel ammonia can be stably burned (oxidized) as a fuel. Ammonia is also known as a reducing substance for nitrogen oxide (NOx). In the reduction region R2, the nitrogen oxide (NOx) is reduced by the primary reduction ammonia being used as a reducing agent. Although a case where fuel ammonia and natural gas are combusted as fuels is described in the present embodiment, the present disclosure is not limited thereto. In other words, the gas turbine A may be so-called ammonia-only combustion using only fuel ammonia without using natural gas as a fuel.

The turbine 3 generates rotational power by using the combustion exhaust gas supplied from the combustion chamber 2b as a drive gas. As shown, the turbine 3 is axially coupled to the compressor 1 and the generator G The compressor 1 and the generator G are driven to rotate by the rotational power of the turbine 3. The turbine 3 exhausts post-power recovery combustion exhaust gas toward the reduction catalyst chamber 4.

The reduction catalyst chamber 4 is filled with a reduction catalyst. In the reduction catalyst chamber 4, the nitrogen oxide (NOx) contained in the combustion exhaust gas is reduced to nitrogen ($N_2$) through reduction treatment.

The natural gas supply unit 5 is a fuel supply unit supplying a predetermined amount of natural gas as a fuel to the premixing unit 2a.

The ammonia supply unit 6 supplies a predetermined amount of fuel ammonia as a fuel to the premixing unit 2a and supplies the primary reduction ammonia as a reducing agent to the reduction region R2 in the combustion chamber 2b via the mixer 7. In addition, the ammonia supply unit 6 supplies the secondary reduction ammonia to the part that is directly ahead of the reduction catalyst chamber 4. In other words, the ammonia supply unit 6 supplies the primary reduction ammonia as a nitrogen oxide reducing agent into the combustor 2 via the mixer 7 and reduces the nitrogen oxide in the combustion exhaust gas by mixing the secondary reduction ammonia with the combustion exhaust gas discharged from the combustor 2. Each of the primary reduction ammonia supply amount in the ammonia supply unit 6 and the secondary reduction ammonia supply amount in the ammonia supply unit 6 is appropriately controlled by the controller 9.

The mixer 7 is a gas mixer mixing the primary reduction ammonia supplied from the ammonia supply unit 6 with the secondary combustion air supplied from the compressor 1 and supplying the combustion chamber 2b with a second mixed gas, which is the result of the mixing. A passage path for the second mixed gas in the mixer 7 is provided with a stirring mechanism (such as a baffle plate and a stirring blade, not shown) for an appropriate state of mixing between the primary reduction ammonia and the secondary combustion air.

The gas analyzer 8 is provided downstream of the reduction catalyst chamber 4. The gas analyzer 8 measures the concentrations of the residual ammonia and the residual nitrogen oxide contained in the combustion exhaust gas discharged from the combustor 2. Specifically, the gas analyzer 8 measures each of the concentrations of the residual ammonia and the residual nitrogen oxide contained in the combustion exhaust gas that has flowed through the reduction catalyst chamber 4. The concentration of the residual nitrogen oxide is the concentration of the nitrogen oxide not reduced by the secondary reduction ammonia and the reduction catalyst and is the concentration of the nitrogen oxide discharged from the outlet of the reduction catalyst chamber 4. The concentration of the residual ammonia, which is a so-called slip ammonia concentration, is the concentration of the ammonia discharged from the outlet of the reduction catalyst chamber 4.

The gas analyzer 8 outputs the measured concentrations of the residual nitrogen oxide and residual ammonia to the controller 9.

The controller 9 controls each of the primary reduction ammonia supply amount in the ammonia supply unit 6 and the secondary reduction ammonia supply amount in the ammonia supply unit 6. For example, the controller 9 controls at least one of the primary reduction ammonia supply amount and the amount of mixing of the secondary reduction ammonia with the combustion exhaust gas in accordance with the concentrations of the residual nitrogen oxide and the residual ammonia contained in the combustion exhaust gas discharged from the combustor 2. Here, the amount of mixing of the secondary reduction ammonia with the combustion exhaust gas is the flow rate of the secondary reduction ammonia supplied to the part directly ahead of the reduction catalyst chamber 4 from the ammonia supply unit 6.

Next, the operation of the combustion device and the gas turbine A configured as described above will be described in detail. In the combustion device and the gas turbine A according to the present embodiment, the compressed air (primary combustion air) generated by the compressor 1 is mixed at or near the stoichiometric ratio with the fuel (natural gas and fuel ammonia) in the premixing unit 2a of the combustor 2 and the mixed gas is generated as a result. The mixed gas is supplied from the premixing unit 2a to the combustion region R1 of the combustion chamber 2b and is combusted by being ignited by a burner in the combustion region R1.

The mixed gas is a mixture of the primary combustion air and the fuel (natural gas and fuel ammonia), and thus some unburned component may remain although the fuel burns with almost no unburned component generated in the combustion region R1. The combustion exhaust gas generated in the combustion region R1 is high-temperature and high-pressure exhaust gas containing nitrogen oxide (NOx) and containing some unburned fuel component. The temperature of the combustion exhaust gas is, for example, 800 to 1,500° C. and the pressure of the combustion exhaust gas is, for example, approximately 8 to 20 atm.

The combustion exhaust gas undergoes reduction treatment and two-stage combustion treatment in the reduction region R2 to which the primary reduction ammonia and the secondary combustion air are supplied. In other words, the nitrogen oxide (NOx) in the combustion exhaust gas is reduced by the primary reduction ammonia in a high-temperature and high-pressure atmosphere and becomes nitrogen gas and the unburned component is combusted (oxidized) by the secondary combustion air. Accordingly, the combustion exhaust gas exhausted from the combustor 2 is high-temperature and high-pressure exhaust gas reduced in terms of concentrations of the nitrogen oxide (NOx) and unburned fuel component as compared with the part directly behind the combustion region R1 and is supplied from the combustor 2 to the turbine 3 such that power is generated in the turbine 3.

The turbine 3 rotationally drives the generator G and the compressor 1, which are axially coupled to each other, with the power generated due to the combustion exhaust gas. As a result, the generator G outputs electric power to an external load and the compressor 1 compresses the air taken in from the outside air and supplies the compressed air to the combustor 2.

With the power recovered by the turbine 3, the combustion exhaust gas is supplied to the reduction catalyst chamber 4 and undergoes reduction treatment. In addition, the secondary reduction ammonia is supplied from the ammonia supply unit 6 to the part directly ahead of the reduction catalyst chamber 4. Accordingly, the combustion exhaust gas is supplied to the reduction catalyst chamber 4 in a state where the combustion exhaust gas is mixed with the secondary reduction ammonia. Then, in the reduction catalyst chamber 4, the nitrogen oxide in the combustion exhaust gas is reduced by the reduction ammonia and the reduction catalyst. Here, the combustion exhaust gas supplied to the reduction catalyst chamber 4 may contain unburned primary reduction ammonia. Accordingly, in this case, the reduction catalyst chamber 4 reduces the nitrogen oxide in the combustion exhaust gas with the unburned primary reduction ammonia, the secondary reduction ammonia, and the reduction catalyst.

The gas analyzer 8 measures the concentration of the nitrogen oxide in the combustion exhaust gas not reduced by the reduction ammonia and the reduction catalyst (residual NOx concentration) and outputs the residual NOx concentration to the controller 9. In addition, the gas analyzer 8 measures the concentration of the residual ammonia in the combustion exhaust gas exhausted from the reduction catalyst chamber 4 (residual $NH_3$ concentration) and outputs the residual $NH_3$ concentration to the controller 9.

The controller 9 controls the flow rate of the primary reduction ammonia supplied from the ammonia supply unit 6 and the flow rate of the secondary reduction ammonia supplied from the ammonia supply unit 6 such that the residual NOx concentration output from the gas analyzer 8 becomes equal to or less than a regulatory value and the residual $NH_3$ concentration output from the gas analyzer 8 becomes equal to or less than a regulatory value.

Hereinafter, the operation of the controller 9 according to an embodiment of the present disclosure will be described.

The controller 9 according to an embodiment of the present disclosure is characterized by examining the amount of outlet concentration change by increasing or decreasing the amount of the primary reduction ammonia. This is because the exhaust gas concentration at the engine outlet in the case where the amount of the primary reduction ammonia is change varies with the aging deterioration of the combustor 2 and operating conditions (such as air flow rate, pressure, and fuel concentration).

For example, the temperature in the combustor 2 may decrease and the unburned component of the ammonia may be discharged as a result in a case where the fuel concentration in the combustor 2 is low. In this case, the unburned component, that is, the $NH_3$ concentration at the outlet of the denitrification device can be reduced by the amount of the primary reduction ammonia being increased and the temperature in the combustor 2 being raised. Here, the denitrification device in this case refers to the reduction catalyst chamber 4.

However, once the amount of the primary reduction ammonia is increased as described above with the gas turbine operated at a constant output, for example, the amount of natural gas supply to the combustor 2 is reduced, and thus the combustion temperature does not rise. Accordingly, in the case of constant-output operation, the unburned $NH_3$ concentration decreases when the primary reduction ammonia supply amount is reduced.

Once the primary reduction ammonia supply amount is excessively increased, an increase in local ammonia concentration occurs and denitrification or combustion is not completed up to the outlet of the combustor 2. As a result, the $NH_3$ concentration at the outlet of the denitrification device may exceed the regulatory value. Accordingly, the amount of the primary reduction ammonia needs to be reduced in this case as well.

As described above, whether an increase in the amount of the primary reduction ammonia is better or a reduction in the amount of the primary reduction ammonia is better varies with the operating conditions, the aging degradation, and the like. Accordingly, the controller 9 measures the ammonia ($NH_3$) concentration at the outlet of the denitrification device (reduction catalyst chamber 4) with the gas analyzer 8 by increasing or decreasing the amount of the primary reduction ammonia and monitors the amount of change in the ammonia ($NH_3$) concentration. As a result, the controller 9 is capable of performing control without being affected by the operating conditions, the aging degradation, and the like.

Figure 3:
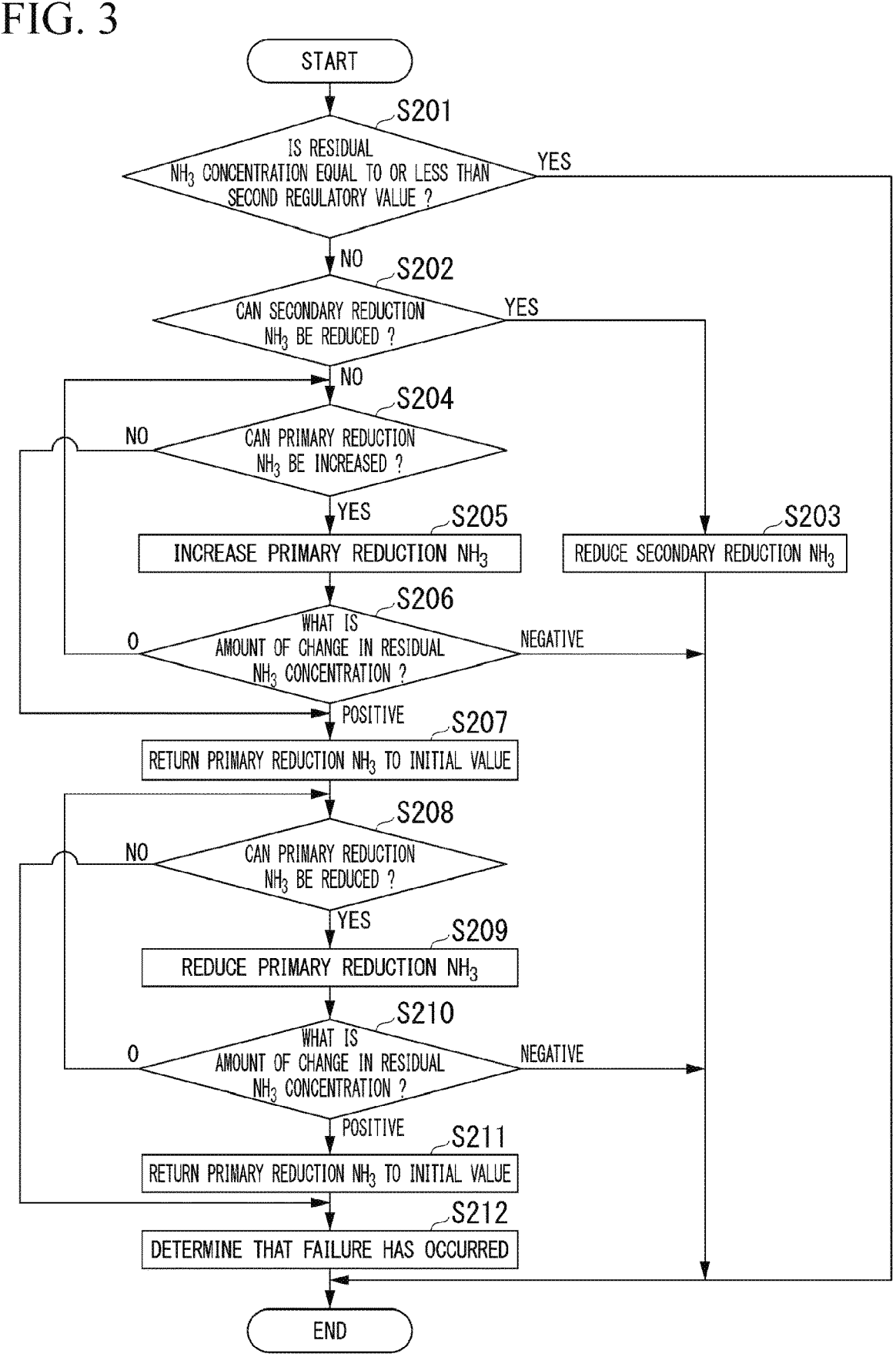
FIG. 3 is a flowchart of a first operation according to an embodiment of the present disclosure.
Figure 4:
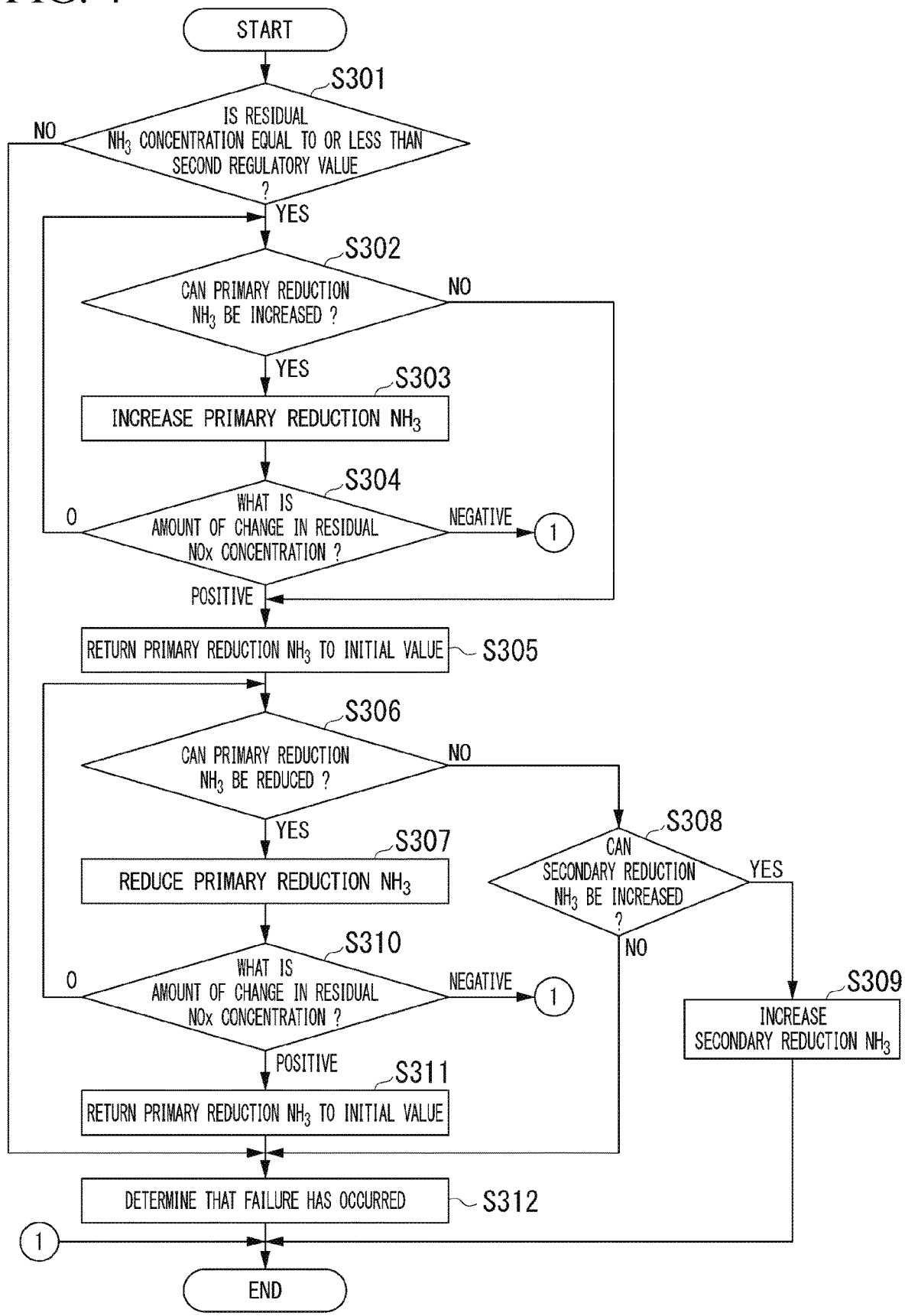
FIG. 4 is a flowchart of a second operation according to an embodiment of the present disclosure.

Hereinafter, the operation of the controller 9 will be described in detail with reference to FIGS. 2, 3, and 4.

Figure 2:
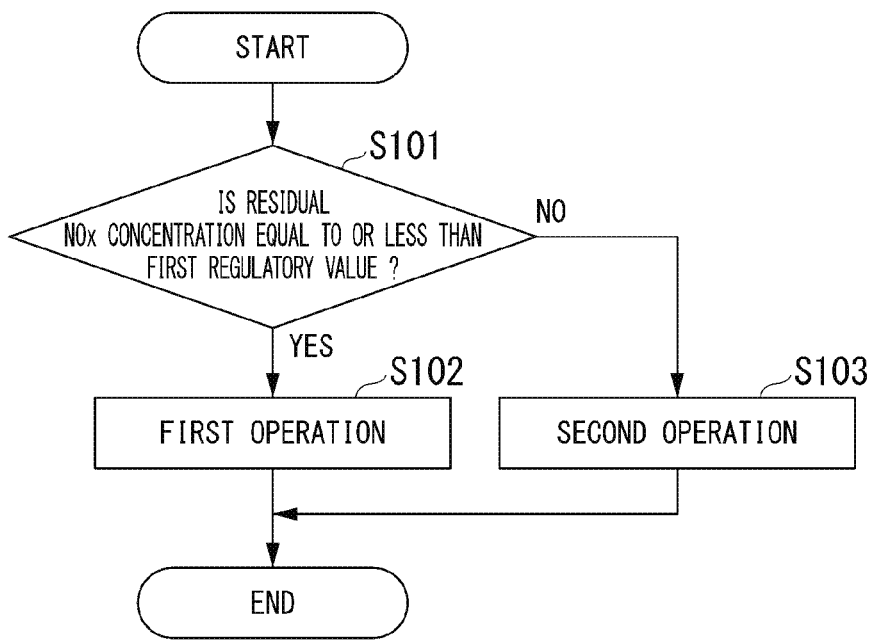
FIG. 2 is a flowchart of an operation of a controller according to an embodiment of the present disclosure.

As shown in FIG. 2, the controller 9 determines whether or not the residual NOx concentration output from the gas analyzer 8 is equal to or less than a first regulatory value (Step S101). In a case where the residual NOx concentration output from the gas analyzer 8 is equal to or less than the first regulatory value, the controller 9 executes a first operation (Step S102). In a case where the residual NOx concentration output from the gas analyzer 8 exceeds the first regulatory value, the controller 9 executes a second operation (Step S103).

(First Operation)

Hereinafter, the first operation of the controller 9 according to an embodiment of the present disclosure will be described in detail with reference to FIG. 3. FIG. 3 is a flowchart of the first operation in the controller 9 according to an embodiment of the present disclosure.

The controller 9 determines whether or not the residual $NH_3$ concentration output from the gas analyzer 8 is equal to or less than a second regulatory value (Step S201). In a case where the residual $NH_3$ concentration output from the gas analyzer 8 exceeds the second regulatory value, the controller 9 determines whether or not the secondary reduction ammonia supply amount can be reduced (Step S202).

Here, the range of the flow rate of the secondary reduction ammonia that can be supplied from the ammonia supply unit 6 (supply range for denitrification) is set in advance. Accordingly, the controller 9 determines that the secondary reduction ammonia supply amount can be reduced in a case where the controller 9 determines that the flow rate of the secondary reduction ammonia that is reduced falls within the supply range for denitrification even after the flow rate of the secondary reduction ammonia is reduced. The controller 9 determines that the secondary reduction ammonia supply amount cannot be reduced in a case where the controller 9 determines that the flow rate of the secondary reduction ammonia that is reduced falls out of the supply range for denitrification by the flow rate of the secondary reduction ammonia being reduced.

In a case where the controller 9 determines in the processing of Step S201 that the residual $NH_3$ concentration output from the gas analyzer 8 is equal to or less than the second regulatory value, both the residual NOx concentration and the residual $NH_3$ concentration are equal to or less than the predetermined regulatory values, and thus the controller 9 terminates the first operation.

In a case where the controller 9 determines in the processing of Step S202 that the secondary reduction ammonia supply amount can be reduced, the controller 9 reduces the secondary reduction ammonia supply amount and terminates the first operation (Step S203).

In a case where the controller 9 determines that the secondary reduction ammonia supply amount cannot be reduced, the controller 9 determines whether or not the primary reduction ammonia supply amount can be increased (Step S204).

Here, the range of the flow rate of the primary reduction ammonia that can be supplied from the ammonia supply unit 6 (supply range for reduction) is set in advance. Accordingly, the controller 9 determines that the primary reduction ammonia supply amount can be increased in a case where the controller 9 determines that the flow rate of the primary reduction ammonia that is increased falls within the supply range for reduction even after the flow rate of the primary reduction ammonia is increased. The controller 9 determines that the primary reduction ammonia supply amount cannot be increased in a case where the controller 9 determines that the flow rate of the primary reduction ammonia that is increased falls out of the supply range for reduction by the flow rate of the primary reduction ammonia being increased.

In a case where the controller 9 determines that the primary reduction ammonia supply amount can be increased, the controller 9 increases the primary reduction ammonia supply amount (Step S205). In a case where the controller 9 determines in Step S204 that the primary reduction ammonia supply amount cannot be increased, the controller 9 returns the primary reduction ammonia supply amount until the determination to the value before the processing of Step S204 (Step S207).

After increasing the primary reduction ammonia supply amount in the processing of Step S205, the controller 9 determines whether the amount of change in the residual $NH_3$ concentration output from the gas analyzer 8 is positive, negative, or 0 (zero) (Step S206). In a case where the amount of change in the residual $NH_3$ concentration output from the gas analyzer 8 is 0 (zero), the controller 9 executes the processing of Step S204 again. The controller 9 terminates the first operation in a case where the amount of change in the residual $NH_3$ concentration output from the gas analyzer 8 is negative. Here, conceivable as an example of the case where the amount of change in the residual $NH_3$ concentration is negative is a case where the temperature in the combustor 2 increases and the unburned ammonia decreases as a result of an increase in the primary reduction ammonia supply amount when the concentration of the fuel in the combustor 2 is low.

In a case where the amount of change in the residual $NH_3$ concentration output from the gas analyzer 8 is positive, the controller 9 returns the primary reduction ammonia supply amount to the initial value (Step S207). Here, the initial value is the primary reduction ammonia supply amount before the processing of Step S204.

Next, the controller 9 determines whether or not the primary reduction ammonia supply amount can be reduced (Step S208). In a case where the controller 9 determines that the primary reduction ammonia supply amount can be reduced, the controller 9 reduces the primary reduction ammonia supply amount (Step S209). In a case where the controller 9 determines that the reduction ammonia supply amount cannot be reduced, the controller 9 determines that a failure has occurred in the combustion device or the catalyst reduction unit (Step S212).

After reducing the primary reduction ammonia supply amount in the processing of Step S209, the controller 9 determines whether the amount of change in the residual $NH_3$ concentration output from the gas analyzer 8 is positive, negative, or 0 (zero) (Step S210). In a case where the amount of change in the residual $NH_3$ concentration output from the gas analyzer 8 is 0 (zero), the controller 9 executes the processing of Step S208 again. The controller 9 terminates the first operation in a case where the amount of change in the residual $NH_3$ concentration output from the gas analyzer 8 is negative. Here, conceivable as an example of the case where the amount of change in the residual $NH_3$ concentration is negative is a case where the residual $NH_3$ concentration decreases by the primary reduction ammonia supply amount being reduced when the primary reduction ammonia supply amount exceeds the amount required for denitrification.

In a case where the amount of change in the residual $NH_3$ concentration output from the gas analyzer 8 is positive, the controller 9 returns the primary reduction ammonia supply amount to the initial value (Step S211) and determines that a failure has occurred in the combustion device or the catalyst reduction unit (Step S212). Here, the initial value in Step S211 is the primary reduction ammonia supply amount before the processing of Step S208.

(Second Operation)

Next, the second operation of the controller 9 according to an embodiment of the present disclosure will be described in detail with reference to FIG. 4. FIG. 4 is a flowchart of the second operation in the controller 9 according to an embodiment of the present disclosure.

The controller 9 determines whether or not the residual $NH_3$ concentration output from the gas analyzer 8 is equal to or less than the second regulatory value (Step S301). In a case where the residual $NH_3$ concentration output from the gas analyzer 8 is equal to or less than the second regulatory value, the controller 9 determines whether or not the primary reduction ammonia supply amount can be increased (Step S302). In a case where the residual $NH_3$ concentration output from the gas analyzer 8 exceeds the second regulatory value, the controller 9 determines that a failure has occurred in the combustion device or the catalyst reduction unit (Step S312).

In a case where the controller 9 determines in the processing of Step S302 that the primary reduction ammonia supply amount cannot be increased, the controller 9 returns the amount of increase in the primary reduction ammonia supply amount to the value before the processing of Step S302 (Step S305). In a case where the controller 9 determines that the flow rate of the primary reduction ammonia that is increased falls within the supply range for reduction even after the flow rate of the primary reduction ammonia is increased, the controller 9 determines that the primary reduction ammonia supply amount can be increased.

In a case where the controller 9 determines in the processing of Step S302 that the primary reduction ammonia supply amount can be controlled, the controller 9 increases the primary reduction ammonia supply amount (Step S303).

After increasing the primary reduction ammonia supply amount in the processing of Step S303, the controller 9 determines whether the amount of change in the residual NOx concentration output from the gas analyzer 8 is positive, negative, or 0 (zero) (Step S304). In a case where the amount of change in the residual NOx concentration output from the gas analyzer 8 is 0 (zero), the controller 9 executes the processing of Step S302 again. The controller 9 terminates the second operation in a case where the amount of change in the residual NOx concentration output from the gas analyzer 8 is negative. Here, conceivable as an example of the case where the amount of change in the residual NOx concentration is negative in Step S304 is a case where the amount of input to the combustor 2 (primary reduction ammonia supply amount) falls short of the amount of ammonia that is required for reduction of the NOx generated in the combustor 2 and the shortage is resolved by an increase in the primary reduction ammonia supply amount.

In a case where the amount of change in the residual NOx concentration output from the gas analyzer 8 is positive, the controller 9 returns the primary reduction ammonia supply amount to the initial value (Step S305). The initial value in the processing of Step S305 is the primary reduction ammonia supply amount before the processing of Step S302.

Next, the controller 9 determines whether or not the primary reduction ammonia supply amount can be reduced (Step S306). In a case where the controller 9 determines that the primary reduction ammonia supply amount can be reduced, the controller 9 reduces the primary reduction ammonia supply amount (Step S307).

The controller 9 proceeds to the processing of Step S308 in a case where the controller 9 determines that the primary reduction ammonia supply amount cannot be reduced.

In a case where the controller 9 determines in the processing of Step S308 that the secondary reduction ammonia supply amount cannot be increased, the controller 9 determines that a failure has occurred in the combustion device (Step S312). In a case where the controller 9 determines in the processing of Step S308 that the secondary reduction ammonia supply amount can be increased, the controller 9 increases the secondary reduction ammonia supply amount (Step S309) and terminates the second operation.

After reducing the primary reduction ammonia supply amount in the processing of Step S307, the controller 9 determines whether the amount of change in the residual NOx concentration output from the gas analyzer 8 is positive, negative, or 0 (zero) (Step S310). In a case where the amount of change in the residual NOx concentration output from the gas analyzer 8 is 0 (zero), the controller 9 executes the processing of Step S306 again. The controller 9 terminates the second operation in a case where the amount of change in the residual NOx concentration output from the gas analyzer 8 is negative. Here, conceivable as an example of the case where the amount of change in the residual NOx concentration is negative in Step S310 is a case where the amount of NOx discharge is reduced as a result of primary reduction ammonia reduction when NOx generation entailed by primary reduction ammonia combustion is the main source of NOx discharge.

In a case where the amount of change in the residual NOx concentration output from the gas analyzer 8 is positive, the controller 9 returns the primary reduction ammonia supply amount to the initial value (Step S311) and determines that a failure has occurred in the combustion device or the catalyst reduction unit (Step S312). The initial value in the processing of Step S311 is the primary reduction ammonia supply amount before the processing of Step S306.

As described above, the controller 9 according to the present embodiment controls at least one of the primary reduction ammonia supply amount and the amount of mixing of the secondary reduction ammonia with the combustion exhaust gas in accordance with the concentrations of the residual NOx and the residual $NH_3$ contained in the combustion exhaust gas discharged from the combustor 2. As a result, the controller 9 is capable of appropriately controlling the primary reduction ammonia supply amount or the secondary reduction ammonia supply amount such that both the residual NOx concentration and the residual $NH_3$ concentration are equal to or less than the predetermined regulatory values.

More specifically, the controller 9 first reduces the amount of mixing of the secondary reduction ammonia with the combustion exhaust gas, not the primary reduction ammonia, in a case where the residual NOx concentration is equal to or less than the first regulatory value and the residual $NH_3$ concentration exceeds the second regulatory value. As a result, the controller 9 is capable of reducing the ammonia that does not contribute to power and achieving energy loss minimization by minimizing the secondary reduction ammonia supply amount.

The controller 9 changes the primary reduction ammonia flow rate only in a case where the residual $NH_3$ concentration does not become equal to or less than the second regulatory value as a result of secondary reduction ammonia reduction.

In a case where the residual NOx concentration exceeds the first regulatory value and the residual $NH_3$ concentration is equal to or less than the second regulatory value, the controller 9 first changes the primary reduction ammonia supply amount without increasing the amount of mixing of the secondary reduction ammonia. As a result, the controller 9 is capable of reducing the ammonia that does not contribute to power and achieving energy loss minimization by minimizing the secondary reduction ammonia supply amount.

The controller 9 changes the amount of mixing of the secondary reduction ammonia, that is, the secondary reduction ammonia supply amount in a case where the residual NOx concentration exceeds the first regulatory value, the residual $NH_3$ concentration is equal to or less than the second regulatory value, and the primary reduction ammonia supply amount cannot be changed or cannot become equal to or less than the second regulatory value by being changed.

In this manner, the controller 9 changes the primary and secondary reduction ammonia supply amounts in order to observe the exhaust gas regulations (first and second regulatory values) while minimizing the secondary reduction ammonia supply amount.

In a case where the residual NOx concentration exceeds the first regulatory value and the residual $NH_3$ concentration exceeds the second regulatory value, the controller 9 determines that a failure has occurred in the combustion device or the catalyst reduction unit. In a case where the controller 9 determines that a failure has occurred in the combustion device or the catalyst reduction unit, the controller 9 may notify the occurrence of the failure in the combustion device or the catalyst reduction unit. This notification may be a voice notification, a display notification, or a voice-display combination.

The present disclosure is not limited to the embodiment described above and the following modification examples are conceivable as examples.

(1) Fuel ammonia is used as a fuel for the combustor 2 in the combustion device of the above embodiment. Alternatively, natural gas alone may be used as the fuel with the fuel ammonia not used.

(2) The combustion device of the above embodiment uses primary reduction ammonia. Alternatively, the primary reduction ammonia may be eliminated and fuel ammonia may be used as the primary reduction ammonia.

(3) In the combustion device of the above embodiment, the fuel ammonia and the primary reduction ammonia may have any fixed ratio and control for simultaneously changing the flow rates of the fuel ammonia and the primary reduction ammonia may be performed.

(4) The combustion device of the above embodiment may use kerosene or the like instead of natural gas as the fuel. In addition, ammonia may be the only fuel of the combustion device of the above embodiment.

(5) The embodiment described above relates to a case where the present disclosure is applied to the combustion device of the gas turbine A. The present disclosure is not limited thereto. The combustion device according to the present disclosure is applicable to various devices other than the gas turbine A and the devices include boilers and incineration facilities.

(6) In the first operation of the embodiment described above, the processing of Steps S204 and S205 and the processing of Steps S208 and S209 may be replaced with each other. In other words, the controller 9 may increase the primary reduction ammonia in a case where the controller 9 determines that the regulation cannot be cleared by means of reduction after reducing the primary reduction ammonia and confirming the amount of change although the controller 9 reduces the primary reduction ammonia in a case where the controller 9 determines that the regulation cannot be cleared by means of increase after increasing the primary reduction ammonia and confirming the amount of change in the first operation of the embodiment described above.

(7) In the second operation of the embodiment described above, the processing of Steps S302 and S303 and the processing of Steps S306 and S307 may be replaced with each other. In other words, the controller 9 may increase the primary reduction ammonia in a case where the controller 9 determines that the regulation cannot be cleared by means of reduction after reducing the primary reduction ammonia and confirming the amount of change although the controller 9 reduces the primary reduction ammonia in a case where the controller 9 determines that the regulation cannot be cleared by means of increase after increasing the primary reduction ammonia and confirming the amount of change in the second operation of the embodiment described above.

(8) Although the gas analyzer 8 is provided only downstream of the reduction catalyst chamber 4 in the embodiment described above, the present disclosure is not limited thereto. For example, the gas analyzer 8 may be provided upstream of the reduction catalyst chamber 4, that is, directly ahead of the reduction catalyst chamber 4 as well.

An interface circuit and the like constitute the controller 9 and the interface circuit transmits and receives various signals to and from a central processing unit (CPU), a read only memory (ROM), a random access memory (RAM), and each of the electrically interconnected parts of the ammonia supply unit 6, the gas analyzer 8, and the like. The CPU performs various arithmetic processing due to various rewritable arithmetic control programs stored in the ROM and communicates with each part. As a result, the CPU controls at least one of the primary reduction ammonia supply amount and the amount of mixing of the secondary reduction ammonia with the combustion exhaust gas.

INDUSTRIAL APPLICABILITY

With the combustion device and the gas turbine according to the present disclosure, it is possible to appropriately control the amount of primary reduction ammonia supply or the amount of secondary reduction ammonia supply.

REFERENCE SIGNS LIST

A Gas turbine
1 Compressor
2 Combustor
3 Turbine

4 Reduction catalyst chamber
5 Natural gas supply unit
6 Ammonia supply unit
7 Mixer
8 Gas analyzer
9 Controller

The invention claimed is:

1. A combustion device comprising:
an ammonia supply unit that supplies primary reduction ammonia as a nitrogen oxide reducing agent into a combustor and that supplies secondary reduction ammonia mixing with combustion exhaust gas discharged from the combustor to reduce nitrogen oxide contained in the combustion exhaust gas; and
a gas analyzer that measures concentrations of residual ammonia and residual nitrogen oxide contained in the combustion exhaust gas discharged from the combustor and outputs the measured concentrations of the residual nitrogen oxide and residual ammonia to a controller,
wherein the controller is configured to control at least one of the amount of supply of the primary reduction ammonia and the amount of supply of the secondary reduction ammonia mixing with the combustion exhaust gas in accordance with the concentrations of the residual nitrogen oxide and residual ammonia measured by the gas analyzer and further in accordance with a supply range for reduction of the primary reduction ammonia and a supply range for denitrification of the secondary reduction ammonia, and
wherein the controller is configured to reduce the amount of supply of the secondary reduction ammonia mixing with the combustion exhaust gas in a case where the residual nitrogen oxide has a concentration equal to or less than a first regulatory value and the residual ammonia has a concentration exceeding a second regulatory value.

2. The combustion device according to claim 1, further comprising:
a catalyst reduction unit that removes the nitrogen oxide contained in the combustion exhaust gas with which the secondary reduction ammonia is mixed, by using a reduction catalyst,
wherein the controller is configured to control the amount of supply of the secondary reduction ammonia in accordance with concentrations of the residual nitrogen oxide and the residual ammonia contained in the combustion exhaust gas that has flowed through the catalyst reduction unit.

3. The combustion device according to claim 2, wherein the controller is configured to determine that a failure has occurred in the combustion device or the catalyst reduction unit in a case where the residual nitrogen oxide has a concentration exceeding a first regulatory value and the residual ammonia has a concentration exceeding a second regulatory value.

4. A gas turbine comprising:
the combustion device according to claim 3; and
the gas analyzer that measures concentrations of the residual nitrogen oxide and the residual ammonia contained in the combustion exhaust gas.

5. The combustion device according to claim 2,
wherein the controller is configured to reduce the amount of mixing of the secondary reduction ammonia with the combustion exhaust gas in a case where the residual nitrogen oxide has a concentration equal to or less than a first regulatory value and the residual ammonia has a concentration exceeding a second regulatory value.

6. The combustion device according to claim 2,
wherein the controller is configured to change the amount of supply of the primary reduction ammonia in a case where the residual nitrogen oxide has a concentration exceeding a first regulatory value and the residual ammonia has a concentration equal to or less than a second regulatory value.

7. The combustion device according to claim 6,
wherein the controller is configured to increase the amount of mixing of the secondary reduction ammonia in a case where the residual nitrogen oxide has a concentration exceeding the first regulatory value, the residual ammonia has a concentration equal to or less than the second regulatory value, and the amount of supply of the primary reduction ammonia is unchangeable.

8. A gas turbine comprising:
the combustion device according to claim 2; and
the gas analyzer that measures concentrations of the residual nitrogen oxide and the residual ammonia contained in the combustion exhaust gas.

9. The combustion device according to claim 1,
wherein the controller is configured to change the amount of supply of the primary reduction ammonia in a case where the residual nitrogen oxide has a concentration exceeding a first regulatory value and the residual ammonia has a concentration equal to or less than a second regulatory value.

10. The combustion device according to claim 9,
wherein the controller is configured to increase the amount of mixing of the secondary reduction ammonia in a case where the residual nitrogen oxide has a concentration exceeding the first regulatory value, the residual ammonia has a concentration equal to or less than the second regulatory value, and the amount of supply of the primary reduction ammonia is unchangeable.

11. A gas turbine comprising:
the combustion device according to claim 10; and
the gas analyzer that measures concentrations of the residual nitrogen oxide and the residual ammonia contained in the combustion exhaust gas.

12. A gas turbine comprising:
the combustion device according to claim 9; and
the gas analyzer that measures concentrations of the residual nitrogen oxide and the residual ammonia contained in the combustion exhaust gas.

13. A gas turbine comprising:
the combustion device according to claim 1; and
the gas analyzer that measures concentrations of the residual nitrogen oxide and the residual ammonia contained in the combustion exhaust gas.

* * * * *